(12) United States Patent
Zhang

(10) Patent No.: US 11,949,516 B2
(45) Date of Patent: Apr. 2, 2024

(54) METHOD AND DEVICE FOR SIDELINK WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 72 days.

(21) Appl. No.: 17/384,810

(22) Filed: Jul. 26, 2021

(65) Prior Publication Data
US 2022/0038220 A1 Feb. 3, 2022

(30) Foreign Application Priority Data
Jul. 28, 2020 (CN) .......................... 202010739383.X

(51) Int. Cl.
*H04W 72/04* (2023.01)
*H04L 1/1812* (2023.01)
*H04L 1/1829* (2023.01)
*H04L 1/1867* (2023.01)
*H04W 92/18* (2009.01)

(52) U.S. Cl.
CPC .......... *H04L 1/1854* (2013.01); *H04L 1/1819* (2013.01); *H04L 1/1896* (2013.01); *H04W 92/18* (2013.01)

(58) Field of Classification Search
CPC ... H04L 1/1854; H04L 1/1819; H04L 1/1896; H04L 1/1607; H04L 5/0053; H04L 5/0055; H04L 5/0057; H04L 5/0064; H04W 92/18
See application file for complete search history.

(56) References Cited

U.S. PATENT DOCUMENTS

2015/0282198 A1* 10/2015 Wang ................ H04W 28/0205
                                                         370/329
2018/0077074 A1* 3/2018 Sherlock ................ H04L 47/32
2019/0053267 A1* 2/2019 Kim .................. H04W 72/1242
(Continued)

FOREIGN PATENT DOCUMENTS

WO        WO-0122645 A1 *  3/2001   ........... H04L 1/0002

OTHER PUBLICATIONS

Interdigital, Inc.R1-2004298 Remaining Issues on Sidelink RLF, 3GPP TSG RAN WG1 #101, May 25-Jun. 5, 2020 (Year: 2020).*

*Primary Examiner* — Mahbubul Bar Chowdhury

(57) ABSTRACT

The present disclosure provides method and device for wireless communications in sidelink. A first node receives a first signaling and a first radio signal, the first signaling indicating a first priority; determines whether to transmit a second signaling jointly according to a current value of a first counter and the first priority; when determining to transmit the second signaling, transmits the second signaling and updates the first counter's value with an initial value; when determining not to transmit the second signaling, drops transmitting the second signaling and updates the first counter's value by 1; herein, the first signaling comprises configuration information of the first radio signal. The present disclosure addresses the RLF triggered by the data-transmitting device due to the influence of the Half Duplex and/or transmitting capability of the V2X UE, thus enhancing the link robustness.

16 Claims, 4 Drawing Sheets

(56) References Cited

U.S. PATENT DOCUMENTS

| | | | | |
|---|---|---|---|---|
| 2019/0306923 A1* | 10/2019 | Xiong | ............... | H04L 5/0091 |
| 2020/0022089 A1* | 1/2020 | Guo | ............... | H04W 52/242 |
| 2021/0075552 A1* | 3/2021 | Huang | ............... | H04W 64/00 |
| 2022/0022085 A1* | 1/2022 | Ji | ............... | H04W 24/10 |
| 2022/0078811 A1* | 3/2022 | Sundararajan | ............... | H04L 1/0026 |
| 2022/0191890 A1* | 6/2022 | Guo | ............... | H04L 5/0055 |
| 2022/0407658 A1* | 12/2022 | Hwang | ............... | H04L 5/0053 |
| 2023/0107528 A1* | 4/2023 | Liu | ............... | H04W 72/566 |
| | | | | 370/329 |

\* cited by examiner

METHOD AND DEVICE FOR SIDELINK WIRELESS COMMUNICATION

CROSS REFERENCE TO RELATED APPLICATIONS

This application claims the priority benefit of Chinese Patent Application No. 202010739383.X, filed on 28 Jul. 2020, the full disclosure of which is incorporated herein by reference.

BACKGROUND

Technical Field

The present disclosure relates to methods and devices in wireless communication systems, and in particular to a method and a device supporting feedback wireless communications in sidelink.

Related Art

Hybrid Automatic Repeat Request (HARD) is generally applied in cellular networks. Specifically, a transmitting end sends data to a receiving end, and then the receiving end feeds back an ACKnowledgement (ACK) or a Negative-ACKnowledgement (NACK) to the transmitting end depending on whether the data is received correctly. The feedback indicates to the transmitting end whether it is necessary to perform data retransmission, thus increasing the robustness of data transmission.

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR. In response to rapidly growing Vehicle-to-Everything (V2X) traffic, 3GPP has started standards setting and research work under the framework of NR. At the 3GPP RAN #83 Plenary, a decision was made on starting a WI to standardize NR V2X DRX. Different from LTE V2X which only focuses on broadcast traffics, the NR V2X also includes unicast traffics as a way to support more various application scenarios.

SUMMARY

Inventors find through researches that a HARQ feedback mechanism has been introduced in NR V2X unicast transmissions. A Tx User Equipment (Tx UE) transmits data and a Rx UE receives the data. In instances where HARQ is enabled, the Rx UE generates an ACK/NACK depending on whether the data is correctly decoded, specifically, if the data is correctly decoded, an ACK will be generated; if not, a NACK will be generated, instead. Since only Half Duplex transmission is supported by V2X, and there is a limit to the UE's transmitting capability, when requests for both transmitting and receiving coexist or there are multiple requests for transmitting at the same time, a Rx UE will not necessarily be capable for sending an ACK/NACK as feedback. Worse still, if the Tx UE has not received the ACK/NACK feedback for more than one time, a Radio Link Failure (RLF) at the Tx UE side will be triggered.

To address the above problem, the present disclosure proposes a solution. Although the statement above only described a typical scenario of NR V2X for example, the present disclosure is also applicable to other scenarios apart from NR V2X confronting similar issues, such as a relay network, a Device-to-Device (D2D) network, a cellular network or any scenario supporting Half-Duplex UE, where technical effects similar to those in the NR V2X scenarios will be achieved. Additionally, the adoption of a unified solution for various scenarios (including but not limited to NR V2X scenario and downlink communications) contributes to the reduction of hardcore complexity and costs. It should be noted that the embodiments of the first node of the present disclosure and the characteristics in the embodiments may be applied to any other node if no conflict is incurred, and vice versa. In the case of no conflict, the embodiments of the present disclosure and the characteristics in the embodiments may be combined with each other arbitrarily. Particularly, for interpretations of the terminology, nouns, functions, and variants (unless otherwise specified) in the present disclosure, refer to definitions given in TS36 series, TS38 series and TS37 series of 3GPP specifications.

The present disclosure provides a method in a first node for wireless communications, comprising:

receiving a first signaling and a first radio signal, the first signaling indicating a first priority;

determining whether to transmit a second signaling jointly according to a current value of a first counter and the first priority; when determining to transmit the second signaling, transmitting the second signaling and updates a value of the first counter with an initial value; when determining not to transmit the second signaling, dropping transmission of the second signaling and updates the value of the first counter by 1;

herein, the first signaling comprises configuration information of the first radio signal, and the second signaling is used for indicating whether the first radio signal is correctly decoded.

In one embodiment, the present disclosure applies to scenarios supporting HARQ feedback in sidelink.

In one embodiment, a problem to be solved in the present disclosure is that influenced by the Half Duplex and/or transmitting capability of the V2X UE, a first node is unable to feedback an ACK or a NACK, if a data-transmitting device has not received the ACK/NACK feedback for a couple of times, the data transmitting device will trigger an RLF in the end.

In one embodiment, a scheme provided includes: the number of times of failing to feedback the ACK/NACK is accumulated by the first node, and then the first node determines whether to send the ACK/NACK according to the accumulated number and the priority of the ACK/NACK collectively.

In one embodiment, positive effects of the present disclosure include: based on the number of accumulated failures of feeding back ACK/NACK, the first node improves the priority of the ACK/NACK transmission, thus significantly reducing unnecessary RLFs likely to be triggered by the data-transmitting device.

According to one aspect of the present disclosure, comprising:

steps taken by the first receiver and the first transmitter are implemented in an iterative process, including receiving the first signaling and the first radio signal, the first signaling indicating the first priority; determining whether to transmit the second signaling jointly according to the current value of the first counter and the first priority; when determining to transmit the second signaling, transmitting the second signaling and updating the value of the first counter with the initial value; when determining not to transmit the second signaling, dropping transmission of the second signaling and updating the value of the first counter by 1; the value of the first counter, after being updated, is seen as the current value of the first counter in a next iteration.

According to one aspect of the present disclosure, comprising:

determining a second priority jointly according to the current value of the first counter and the first priority;

herein, when the first counter is running, the second priority is no lower than the first priority.

According to one aspect of the present disclosure, comprising:

when the current value of the first counter reaches a first threshold, the second signaling is determined to be transmitted.

According to one aspect of the present disclosure, comprising:

the first transmitter, which transmits a second radio signal; and which updates the value of the first counter with the initial value upon transmission of the second radio signal;

herein, a target receiver of the second radio signal is just the same as the transmitter of the first signaling.

According to one aspect of the present disclosure, comprising:

comparing the second priority and a third priority, when the second priority is higher than the third priority, the second signaling is transmitted; when the second priority is lower than the third priority, the transmission of the second signaling is dropped;

herein, the third priority indicates a priority of a third radio signal.

The present disclosure provides a first node for wireless communications, comprising:

a first receiver, which receives a first signaling and a first radio signal, the first signaling indicating a first priority;

a first transmitter, which determines whether to transmit a second signaling jointly according to a current value of a first counter and the first priority; when determining to transmit the second signaling, the first transmitter transmits the second signaling and updates a value of the first counter with an initial value; when determining not to transmit the second signaling, the first transmitter drops transmission of the second signaling and updates the value of the first counter by 1;

herein, the first signaling comprises configuration information of the first radio signal, and the second signaling is used for indicating whether the first radio signal is correctly decoded.

In one embodiment, the method in the present disclosure is advantageous in the following aspects:

The present disclosure is applicable to HARQ feedback-supporting scenarios in sidelink wireless transmission;

the problem herein is that under the influence of the Half Duplex and/or transmitting capability of the V2X UE, a first node cannot feedback an ACK or a NACK, if a data-transmitting device hasn't received the ACK/NACK feedback for several times, the data-transmitting device will be triggering an RLF;

by employing the method put forward in the present disclosure, the first node manages to accumulate a number of failing feedbacks of an ACK/NACK, and then determines whether to transmit the ACK/NACK jointly according to the accumulated number and the priority of the ACK/NACK;

by employing the method put forward in the present disclosure, the first node, referring to the number of accumulated failures of ACK/NACK feedbacks, improves the priority of the ACK/NACK transmission, thus effectively preventing the data-transmitting device from triggering unnecessary RLFs and contributing to higher link robustness.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
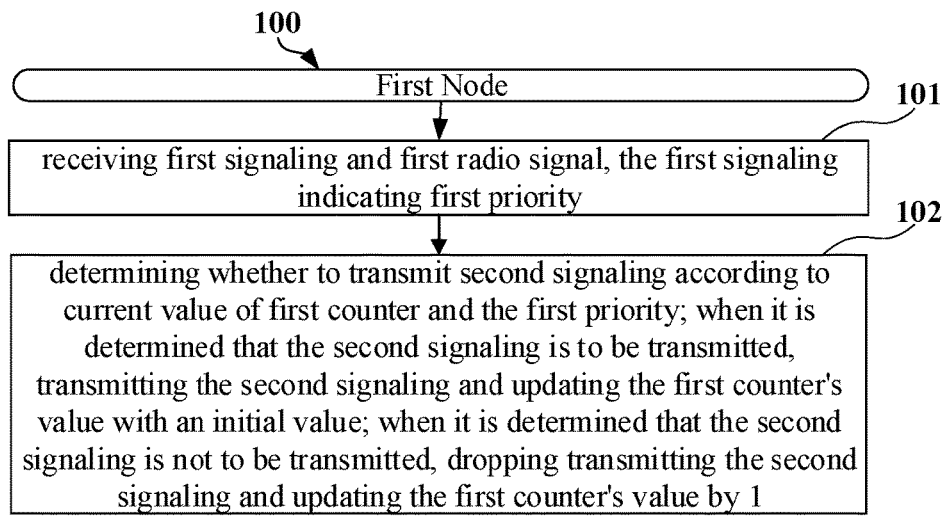
FIG. 1 illustrates a flowchart of a first signaling, a first radio signal, a first counter, a second signaling and a first priority according to one embodiment of the present disclosure.

Embodiment 1 illustrates a flowchart of a first signal and a first-type signaling according to one embodiment of the present disclosure, as shown in FIG. 1.

In Embodiment 1, the first node 100 in the present disclosure receives a first signaling and a first radio signal in step 101, the first signaling indicating a first priority; and determines whether to transmit a second signaling jointly according to a current value of a first counter and the first priority in step 102; when determining to transmit the second signaling, the 100 transmits the second signaling and updates the first counter's value with an initial value; when determining not to transmit the second signaling, the 100 drops transmitting the second signaling and updates the value of the first counter by 1; herein, the first signaling comprises configuration information of the first radio signal, while the second signaling is used to indicate whether the first radio signal is correctly decoded.

In one embodiment, a transmitter of the first signaling is a second node.

In one embodiment, the first signaling comprises Sidelink Control Information (SCI).

In one embodiment, the first signaling is a Physical Sidelink Control Channel (PSCCH).

In one embodiment, the first signaling comprises 1st-stage-SCI and 2nd stage-SCI.

In one embodiment, the 1st-stage-SCI schedules the first radio signal and the 2nd stage-SCI.

In one embodiment, the first signaling comprises a SCI format 1-A and a SCI format 2-A or 2-B.

In one embodiment, the SCI format 1-A in the first signaling is transmitted through a PSCCH.

In one embodiment, the SCI format 1-A in the first signaling schedules the first radio signal and the SCI format 2-A or 2-B in the first signaling.

In one embodiment, the SCI format 2-A or 2-B in the first signaling occupies Physical Sidelink Shared Channel (PSSCH) resources.

In one embodiment, the SCI format 2-A or 2-B in the first signaling is transmitted through a P S SCH.

In one embodiment, the first signaling is transmitted via an air interface.

In one embodiment, the first signaling is transmitted via a radio interface.

In one embodiment, the first signaling is transmitted via a PC5 interface.

In one embodiment, the first signaling is transmitted via a SL.

In one embodiment, the first signaling is a physical layer signaling.

In one embodiment, the first signaling is a dynamic signaling.

In one embodiment, the first signaling is UE-specific.

In one embodiment, the first signaling is UE Group-Specific.

In one embodiment, the first signaling is transmitted by unicast.

In one embodiment, the first signaling is transmitted by groupcast.

In one embodiment, the first signaling comprises a Source Identifier and a Destination Identifier.

In one embodiment, the Source Identifier comprised by the first signaling comprises lower 8 bits in a link layer ID of the second node.

In one embodiment, the Destination Identifier comprised by the first signaling comprises lower 16 bits in the link layer ID of the first node.

In one embodiment, the first radio signal comprises a Source field and a Destination field.

In one embodiment, the Source field comprised by the first radio signal comprises higher 16 bits in the link layer ID of the second node.

In one embodiment, the Destination field comprised by the first radio signal comprises higher 8 bits in the link layer ID of the first node.

In one embodiment, the link layer ID is a Layer-2 (L2) Identifier (ID).

In one embodiment, the link layer ID comprises 24 bits.

In one embodiment, the first signaling indicates the first priority.

In one embodiment, the first priority is carried by the SCI Format 0-1 in the first signaling.

In one embodiment, the first priority indicates a priority of the first radio signal.

In one embodiment, a ProSe per packet priority (PPPP) carried in the first signaling is used to indicate the priority of the first radio signal.

In one embodiment, the PPPP is a positive integer ranging from 0 to 7, used to indicate that a priority value is a positive integer between 1 and 8.

In one embodiment, the fact that two values of the priority differ by 1 indicates that two corresponding levels of the priority are one level apart.

In one embodiment, the smaller value of the PPPP, the higher level of the priority as indicated.

In one embodiment, a value of the PPPP being set to 0 indicates a highest priority.

In one embodiment, the smaller value of the first priority, the higher level of the first priority.

In one embodiment, the first priority being set to a minimum value indicates a highest first priority; while the first priority being set to a maximum value indicates a lowest first priority.

In one embodiment, a value of the first priority being set to 1 indicates the highest first priority.

In one embodiment, the first signaling comprises configuration information of the first radio signal.

In one embodiment, the configuration information of the first radio signal comprises a HARQ feedback enable indicator, the HARQ feedback enable indicator indicating a HARQ ACK/NACK feedback to be sent depending on whether the first radio signal is correctly decoded.

In one embodiment, the configuration information of the first radio signal comprises a cast type, the cast type indicating that the first radio signal is transmitted by unicast, or groupcast or broadcast.

In one embodiment, the configuration information of the first radio signal comprises information of the PSSCH transmitting the first radio signal.

In one embodiment, the configuration information of the first radio signal comprises time-frequency resources occupied by the first radio signal.

In one embodiment, the configuration information of the first radio signal comprises a Modulation and Coding Scheme (MCS) employed by the first radio signal.

In one embodiment, the configuration information of the first radio signal comprises information need for decoding a first bit block.

In one subembodiment, the first priority indicates a priority of the first bit block.

In one embodiment, all or part of the first bit block are used for generating the first radio signal.

In one embodiment, all or part of the first bit block are used together with a reference signal for generating the first radio signal.

In one embodiment, the first radio signal is obtained by all or some bits in the first bit block sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, and Modulation and Up conversion.

In one embodiment, all or some bits in the first bit block are used for generating multiple radio signals, and the first radio signal is one of the multiple radio signals.

In one embodiment, the first radio signal is a PSSCH.

In one embodiment, the first radio signal is transmitted via an air interface.

In one embodiment, the first radio signal is transmitted via a radio interface.

In one embodiment, the first radio signal is transmitted via a PC5 interface.

In one embodiment, the first radio signal is transmitted via a SL.

In one embodiment, the first signaling and the time-frequency resources occupied by the first radio signal belong to a V2X resource pool.

In one embodiment, the first signaling and the time-frequency resources occupied by the first radio signal are reserved for sidelink transmission.

In one embodiment, the first signaling and the first radio signal are received in a same sidelink slot.

In one embodiment, a start time of the first signaling and a start time of the first radio signal are in a same sidelink slot.

In one embodiment, the first counter is used for counting a number of consecutive failed transmissions of HARQ feedback, the HARQ feedback corresponding to a radio signal transmitted by a transmitter of the first signaling; a scheduling signaling corresponding to the radio signal indicates enabling a HARQ feedback.

In one embodiment, the phrase of determining whether to transmit a second signaling jointly according to a current value of a first counter and the first priority includes that when the current value of the first counter is greater than a second threshold, and the first priority is at a highest level, the second signaling is determined to be transmitted.

In one embodiment, the phrase of determining whether to transmit a second signaling jointly according to a current value of a first counter and the first priority includes that when the current value of the first counter is greater than a second threshold, and the first priority is no greater than a third threshold, the second signaling is determined to be transmitted.

In one embodiment, the phrase of determining whether to transmit a second signaling jointly according to a current value of a first counter and the first priority includes that when the current value of the first counter is less than a second threshold, whether to transmit the second signaling or not is determined according to the first priority.

In one embodiment, the phrase of determining whether to transmit a second signaling jointly according to a current value of a first counter and the first priority includes that when the current value of the first counter is equal to a second threshold, whether to transmit the second signaling or not is determined according to the first priority.

In one embodiment, the phrase that whether to transmit the second signaling or not is determined according to the first priority includes a meaning that comparing the first priority and the third priority, when the first priority is higher than the third priority, transmit the second signaling; when the first priority is lower than the third priority, drop transmitting the second signaling.

In one embodiment, when the first priority is equal to the third priority, it is determined that the second signaling is to be transmitted.

In one embodiment, when the first priority is lower than the third priority, it is determined that transmission of the second signaling is to be dropped.

In one embodiment, the third priority indicates a priority of the third radio signal.

In one embodiment, the second threshold is $$\left\lfloor \frac{Q}{2} \right\rfloor.$$

In one embodiment, the second threshold is $$\left\lfloor \frac{2 \times Q}{3} \right\rfloor.$$

In one embodiment, Q is a first expired value, the symbol $\lfloor \cdot \rfloor$ means rounding an input value down to a nearest integer.

In one embodiment, the second threshold is pre-configured.

In one embodiment, the second threshold is pre-specified.

In one embodiment, the second threshold is configured by an RRC signaling.

In one embodiment, the third threshold is pre-configured.

In one embodiment, the third threshold is pre-specified.

In one embodiment, the third threshold is configured by an RRC signaling.

In one embodiment, the third threshold is 1.

In one embodiment, the third threshold is 2.

In one embodiment, the second threshold is configured by a base station.

In one embodiment, the third threshold is configured by a base station.

In one embodiment, the second threshold is determined by UE implementation.

In one embodiment, the third threshold is determined by UE implementation.

In one embodiment, whether to transmit the second signaling is determined jointly according to a current value of the first counter and a fourth priority.

In one embodiment, the fourth priority is jointly determined by the first priority and first information.

In one embodiment, the first information is the cast type comprised in the first signaling.

In one subembodiment, when the cast type comprised in the first signaling refers to unicast, the fourth priority is one level higher than the first priority.

In one subembodiment, when the cast type comprised in the first signaling refers to groupcast, the fourth priority is at the same level as the first priority.

In one embodiment, the first information refers to size of the first bit block.

In one subembodiment, when a number of bits comprised by the first bit block (i.e., size of the first bit block) is greater than a large-packet threshold, the fourth priority is one level higher than the first priority.

In one subembodiment, when a number of bits comprised by the first bit block (i.e., size of the first bit block) is no greater than a large-packet threshold, the fourth priority is at the same level as the first priority.

In one embodiment, the large-packet threshold is pre-configured.

In one embodiment, the large-packet threshold is pre-specified.

In one embodiment, the large-packet threshold is configured by an RRC signaling.

In one embodiment, the large-packet threshold is determined by UE implementation.

In one embodiment, the first information is a value of the second signaling.

In one subembodiment, when the second signaling is an ACK and the cast type comprised by the first signaling is unicast or type2 groupcast, the fourth priority is one level higher than the first priority.

In one subembodiment, when the second signaling is a NACK and the cast type comprised by the first signaling is unicast or type2 groupcast, the fourth priority is at the same level as the first priority.

In one subembodiment, when the second signaling is a NACK and the cast type comprised by the first signaling is type1 groupcast, the fourth priority is one level higher than the first priority.

In one subembodiment, when the second signaling is an ACK and the cast type comprised by the first signaling is type1 groupcast, the fourth priority is at the same level as the first priority.

In one embodiment, the first information is an order of the first radio signal in multiple radio signals generated by the first bit block.

In one subembodiment, when the first radio signal is placed as a last one of the multiple radio signals generated by the first bit block, the fourth priority is one level higher than the first priority.

In one subembodiment, when the first radio signal is placed not as the last one of the multiple radio signals generated by the first bit block, the fourth priority is at the same level as the first priority.

In one embodiment, given that the implementation of determining whether to transmit the second signaling jointly according to a current value of the first counter and the fourth priority is the same as the implementation of determining whether to transmit the second signaling jointly according to a current value of the first counter and the first priority, no further elaboration will be presented here.

In one embodiment, whether to transmit the second signaling is determined depending on a HARQ-ACK Discontinuous Transmission (DTX) estimation value and the first priority.

In one embodiment, the HARQ-ACK DTX estimation value is determined according to a current value of the first counter and a first channel quality.

In one embodiment, the first channel quality comprises a Reference Signal Received Power (RSRP).

In one embodiment, the first channel quality comprises a Reference Signal Received Quality (RSRQ).

In one embodiment, the first channel quality comprises a Received Signal Strength Indicator (RSSI).

In one embodiment, the first channel quality indicates a radio channel quality between a transmitter of the first signaling and the first node.

In one embodiment, when the first channel quality is lower than a channel low quality threshold, the HARQ-ACK DTX estimation value is the current value of the first counter added by P, P being a positive integer no greater than the first expired value.

In one embodiment, when the first channel quality is no lower than the channel low quality threshold, the HARQ-ACK DTX estimation value is the current value of the first counter.

In one embodiment, P is set to a value of 1.

In one embodiment, P is set to a value of 2.

In one embodiment, when the HARQ-ACK DTX estimation value is greater than a second expired value, the second signaling is determined to be transmitted.

In one embodiment, when the HARQ-ACK DTX estimation value is no greater than a second expired value, whether the second signaling is transmitted depends on the first priority.

In one embodiment, the channel low quality threshold is pre-configured.

In one embodiment, the channel low quality threshold is pre-specified.

In one embodiment, the channel low quality threshold is configured by an RRC signaling.

In one embodiment, the channel low quality threshold is determined by UE implementation.

In one embodiment, the second expired value is pre-configured.

In one embodiment, the second expired value is pre-specified.

In one embodiment, the second expired value is configured by a base station.

In one embodiment, the second expired value is comprised in all or part of IEs in an RRC signaling.

In one embodiment, the second expired value is comprised in all or part of fields of an Information Element (IE) in an RRC signaling.

In one embodiment, the second expired value is comprised in a max-HARQ-DTX IE in an RRC signaling.

In one embodiment, the second expired value is comprised in a System Information Block (SIB).

In one embodiment, the second expired value is used by a transmitter of the first signaling for triggering an RLF in a physical layer.

In one embodiment, the second signaling is transmitted through a Physical Sidelink Feedback Channel (PSFCH).

In one embodiment, the second signaling is transmitted through piggyback in a PSSCH.

In one embodiment, the second signaling is transmitted via a PC5 interface.

In one embodiment, the second signaling is transmitted via a SL.

In one embodiment, the second signaling is a physical layer signaling.

In one embodiment, the second signaling is UE-Specific.

In one embodiment, the second signaling is transmitted by unicast.

In one embodiment, time-frequency resources occupied by the second signaling and time-frequency resources occupied by the first signaling belong to a same V2X resource pool.

In one embodiment, the first node determines to transmit a time-domain resource, a frequency-domain resource and a code-domain resource occupied by the second signaling in a way described by clause 16.3 of 3GPP, TS 38.213.

In one embodiment, the phrase of dropping transmission of the second signaling includes that the first node is in a receiving status.

In one embodiment, the phrase of dropping transmission of the second signaling includes that the first node performs energy monitoring.

In one embodiment, the phrase of dropping transmission of the second signaling includes that the first node detects SCI and performs RSRP detection based on a PSSCH scheduled by the SCI.

In one embodiment, the phrase of dropping transmission of the second signaling includes that the first node transmits the third radio signal.

In one embodiment, the phrase of dropping transmission of the second signaling includes that the first node receives the third radio signal.

In one embodiment, updating the value of the first counter with the initial value includes resetting the first counter.

In one embodiment, updating the value of the first counter with the initial value includes updating the value of the first counter with 0.

In one embodiment, updating the value of the first counter with the initial value includes updating the value of the first counter with the first expired value.

In one embodiment, updating the value of the first counter by 1 includes adding the value of the first counter by 1.

In one embodiment, updating the value of the first counter by 1 includes subtracting the value of the first counter by 1.

In one embodiment, channel decoding is performed on a PSSCH according to time-frequency resources scheduled by the first signaling, and it is determined whether the channel decoding is correct according to Cyclic Redundancy Check (CRC).

In one subembodiment, if CRC is not passed, the first radio signal is not correctly decoded; if the CRC is passed, the first radio signal is correctly decoded.

In one embodiment, when the first radio signal is correctly decoded, the second signaling is an ACK; when the first radio signal is not correctly decoded, the second signaling is a NACK.

Embodiment 2

Figure 2:
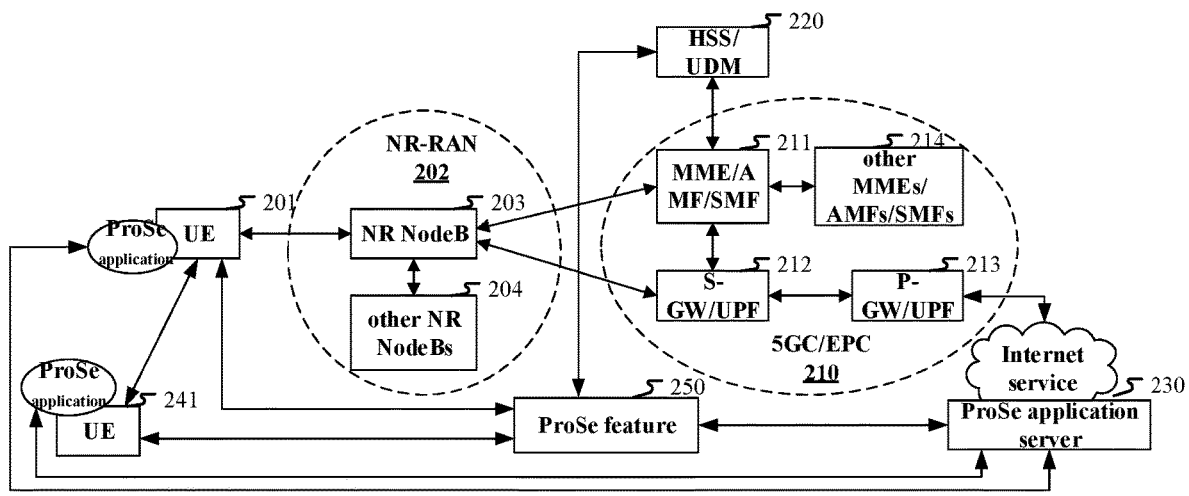
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of NR 5G, Long-Term Evolution (LTE), and Long-Term Evolution Advanced (LTE-A) systems. The NR 5G or LTE, or LTE-A network architecture may be called a 5G System/Evolved Packet System (5GS/EPS) 200 or other appropriate terms. The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted communication units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 corresponds to the first node in the present disclosure.

In one embodiment, the UE 241 corresponds to the second node in the present disclosure.

In one embodiment, the UE 201 and the UE 241 respectively support transmissions in SL.

In one embodiment, the UE 201 and the UE 241 respectively support a PC5 interface.

In one embodiment, the UE 201 and the UE 241 respectively support Vehicle-to-Everything.

In one embodiment, the UE 201 and the UE 241 respectively support V2X traffics.

In one embodiment, the UE 201 and the UE 241 respectively support D2D traffics.

In one embodiment, the UE 201 and the UE 241 respectively support public safety traffics.

In one embodiment, the gNB203 supports Vehicle-to-Everything.

In one embodiment, the gNB203 supports V2X traffics.

In one embodiment, the gNB203 supports D2D traffics.

In one embodiment, the gNB203 supports public safety traffics.

In one embodiment, the gNB203 is a Macro Cell base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large time delay difference.

In one embodiment, the gNB203 is a flight platform.

In one embodiment, the gNB203 is satellite equipment.

In one embodiment, a radio link from the UE 201 to the gNB203 is an uplink (UL).

In one embodiment, a radio link from the gNB203 to the UE 201 is a downlink (DL).

In one embodiment, a radio link between the UE 201 and the UE 241 corresponds to a sidelink (SL) in the present disclosure.

In one embodiment, the UE 201 and the gNB203 are connected by a Uu interface.

In one embodiment, the UE 201 and the UE 241 are connected by a PC5 Reference Point In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is respectively connected to the ProSe applications of the UE 201 and the UE 241 by PC1 Reference Points.

Embodiment 3

Figure 3:
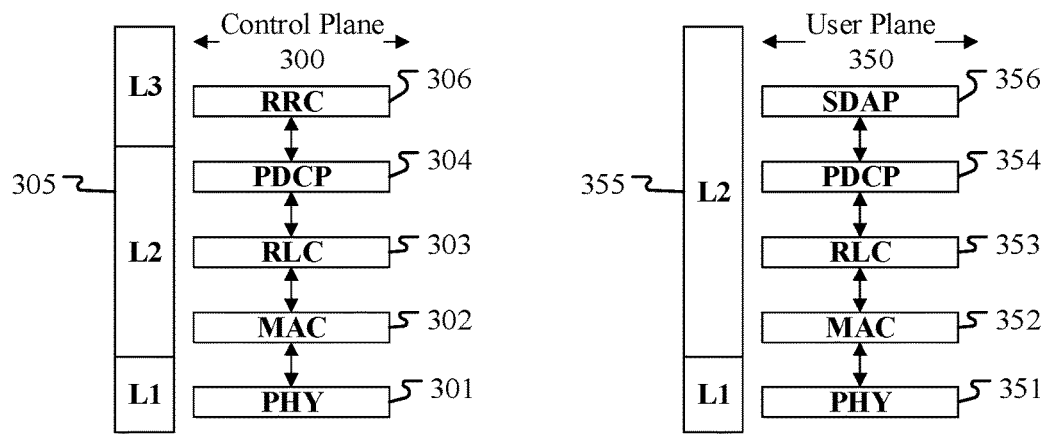
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a UE and a gNB is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection, and also support for handover of a UE between gNBs. The RLC sublayer 303 provides segmentation and reassembling of a packet, retransmission of a lost packet through ARQ, and detection of duplicate packets and protocol errors. The MAC sublayer 302 provides mappings between a logical channel and a transport channel as well as multiplexing of logical channel ID. The MAC sublayer 302 is also responsible for allocating between UEs various radio resources (i.e., resource block) in a cell. The MAC sublayer 302 is also in charge of Hybrid Automatic Repeat Request (HARQ) operation. In the control plane 300, The Radio Resource Control (RRC) sublayer 306 in the L3 layer is responsible for acquiring radio resources (i.e., radio bearer) and configuring the lower layer using an RRC signaling between the gNB and the UE. Although not shown in the figure, above the RRC sublayer 306 in the control plane 300 of the UE there can be a V2X layer, which is in charge of generating a PC5 QoS parameter group and a QoS rule according to received traffic data or traffic requests, generating a PC5 QoS flow corresponding to the PC5 QoS parameter group and sending a PC5 QoS flow ID and the corresponding PC5 QoS parameter group to a Access Stratum (AS) to be used for QoS processing of a packet that belongs to the PC5 QoS flow ID; the V2X layer is also responsible for indicating whether each transmission in the AS layer is a PC5-Signaling (PC5-S) Protocol transmission or a V2X traffic data transmission. The radio protocol architecture of the user plane 350 comprises a layer 1 (L1) and a layer 2 (L2). In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. The radio protocol architecture of UE in the user plane 350 may comprise all or part of protocol sublayers of a SDAP sublayer 356, a PDCP sublayer 354, a RLC sublayer 353 and a MAC sublayer 352. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the PHY301 or the PHY351.

In one embodiment, the first radio signal in the present disclosure is generated by the PHY301 or the PHY351.

In one embodiment, the second signaling in the present disclosure is generated by the PHY301 or the PHY351.

In one embodiment, the first counter in the present disclosure is maintained by the PHY301 or the PHY351.

In one embodiment, the first counter in the present disclosure is maintained by the MAC302 or the MAC352.

In one embodiment, the L2 305 belongs to a higher layer.

In one embodiment, the RRC sublayer 306 in the L3 belongs to a higher layer.

Embodiment 4

Figure 4:
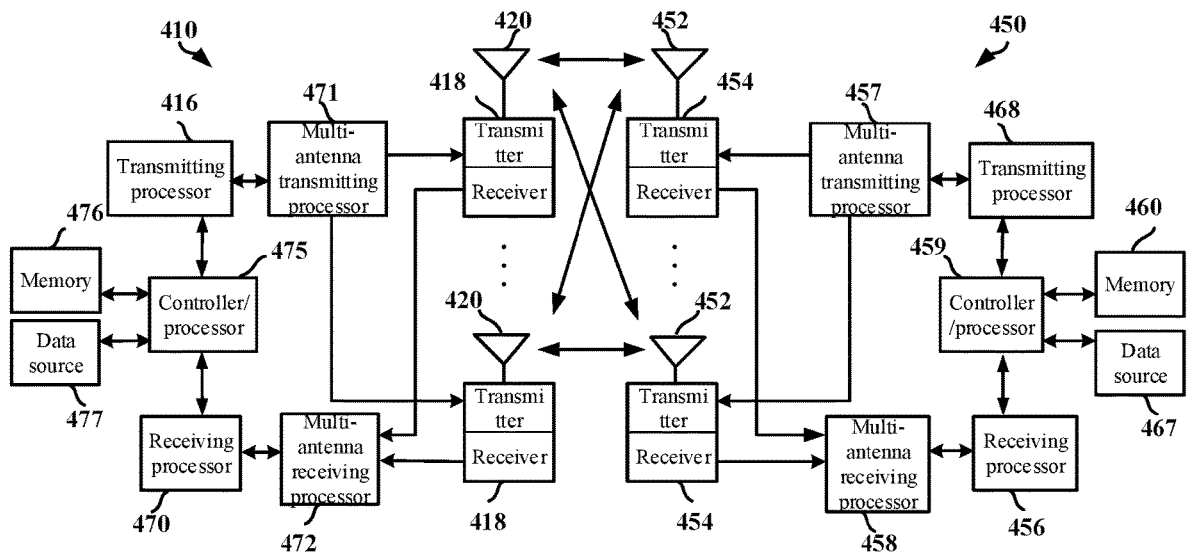
FIG. 4 illustrates a schematic diagram of hardcore modules in a communication device according to one embodiment of the present disclosure.

Embodiment 4 illustrates a schematic diagram of hardcore modules of a communication node according to one embodiment of the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network or the data source 477 is provided to the controller/processor 475. The core network and the data source 477 represent all protocol layers above the L2. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network or all protocol layers above the L2, or various control signals can be provides to the core network or the L3 for processing.

In one embodiment, the first communication device 450 comprises at least one processor and at least one memory.

The at least one memory comprises computer program codes; the at least one memory and the computer program codes are configured to be used in collaboration with the at least one processor. The first communication device 450 at least receives a first signaling and a first radio signal, the first signaling indicating a first priority; determines whether to transmit a second signaling jointly according to a current value of a first counter and the first priority; when determining to transmit the second signaling, transmits the second signaling and updates a value of the first counter with an initial value; when determining not to transmit the second signaling, drops transmission of the second signaling and updates the value of the first counter by 1; herein, the first signaling comprises configuration information of the first radio signal, and the second signaling is used for indicating whether the first radio signal is correctly decoded.

In one embodiment, the first communication device 450 comprises a memory that stores a computer readable instruction program. The computer readable instruction program generates actions when executed by at least one processor. The actions include: receiving a first signaling and a first radio signal, the first signaling indicating a first priority; determining whether to transmit a second signaling jointly according to a current value of a first counter and the first priority; when determining to transmit the second signaling, transmitting the second signaling and updating a value of the first counter with an initial value; when determining not to transmit the second signaling, dropping transmission of the second signaling and updating the value of the first counter by 1; herein, the first signaling comprises configuration information of the first radio signal, and the second signaling is used for indicating whether the first radio signal is correctly decoded.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a UE supporting V2X.

In one embodiment, the first communication device 450 is a UE supporting D2D.

In one embodiment, the first communication device 450 is vehicle-mounted equipment.

In one embodiment, the first communication device 450 is an RSU.

In one embodiment, the second communication device 410 is a UE.

In one embodiment, the second communication device 410 is a UE supporting V2X.

In one embodiment, the second communication device 410 is a UE supporting D2D.

In one embodiment, the second communication device 410 is vehicle-mounted equipment.

In one embodiment, the second communication device 410 is an RSU.

In one embodiment, the second communication device 410 is a base station.

In one embodiment, the antenna 452, the receiver 454, the multi-antenna receiving processor 458, the receiving processor 456 and the controller/processor 459 are used to receive the first signaling in the present disclosure.

In one embodiment, the antenna 420, the transmitter 418, the multi-antenna transmitting processor 471, the transmitting processor 416 and the controller/processor 475 are used to transmit the first signaling in the present disclosure.

In one embodiment, the antenna 452, the receiver 454, the multi-antenna receiving processor 458, the receiving processor 456 and the controller/processor 459 are used to receive the first radio signal in the present disclosure.

In one embodiment, the antenna 420, the transmitter 418, the multi-antenna transmitting processor 471, the transmitting processor 416 and the controller/processor 475 are used to transmit the first radio signal in the present disclosure.

In one embodiment, the antenna 420, the receiver 418, the multi-antenna receiving processor 472, the receiving processor 470 and the controller/processor 475 are used to receive the second signaling in the present disclosure.

In one embodiment, the antenna 452, the transmitter 454, the multi-antenna transmitting processor 457, the transmitting processor 468 and the controller/processor 459 are used to transmit the second signaling in the present disclosure.

In one embodiment, the antenna 420, the receiver 418, the multi-antenna receiving processor 472, the receiving processor 470 and the controller/processor 475 are used to receive the second radio signal in the present disclosure.

In one embodiment, the antenna 452, the transmitter 454, the multi-antenna transmitting processor 457, the transmitting processor 468 and the controller/processor 459 are used to transmit the second radio signal in the present disclosure.

Embodiment 5

Figure 5:
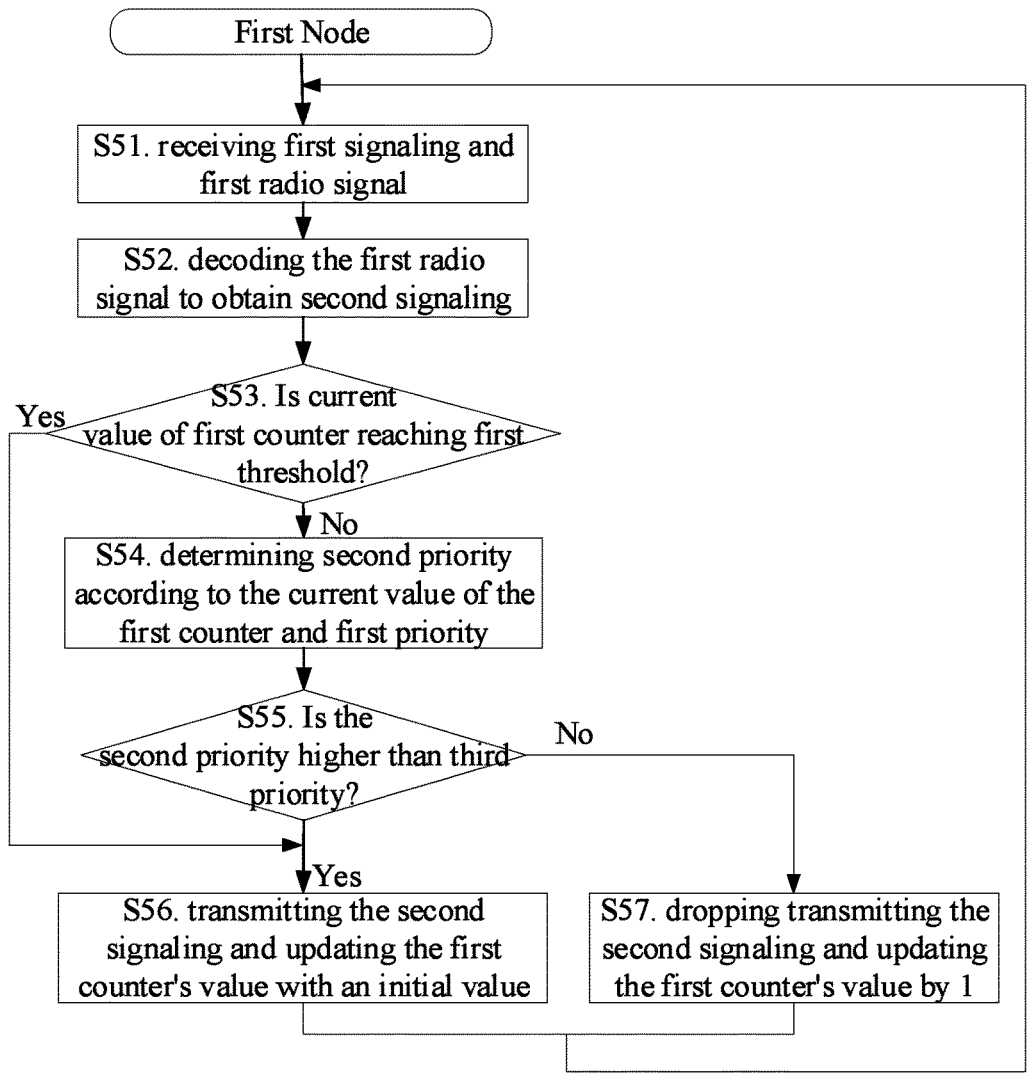
FIG. 5 illustrates a flowchart of processing of a first node according to one embodiment of the present disclosure.

Embodiment 5 illustrates a flowchart of processing of a first node according to one embodiment of the present disclosure, as shown in FIG. 5. Steps in the FIG. 5 are implemented by the first node:

Receiving a first signaling and a first radio signal in step S51; decoding the first radio signal in step S52 to obtain a second signaling; determining in step S53 whether a current value of the first counter reaches a first threshold, if so, jump to step S56, if not, implement step S54; determining a second priority jointly according to the current value of the first counter and a first priority in step S54; and then determining whether the second priority is higher than a third priority in step S55, if so, implement step S56 and go back to step S51, if not, implement step S57 and then go back to step S51; transmitting the second signaling and updating the first counter's value with an initial value in step S56; or dropping transmission of the second signaling and updating the first counter's value by 1 in step S57.

In one embodiment, after being updated the value of the first counter will be used as the current value of the first counter in a next iteration.

In one embodiment, when the current value of the first counter reaches a first threshold, the first node determines to transmit the second signaling as a response.

In one embodiment, when the initial value of the first counter is 0, the action of updating the first counter by 1 includes adding the value of the first counter by 1, the first threshold being the first expired value, when the value of the first counter reaches the first expired value, the first node determines to transmit the second signaling.

In one embodiment, when the initial value of the first counter is the first expired value, the action of updating the first counter by 1 includes subtracting the value of the first counter by 1, the first threshold being 0, when the value of the first counter reaches 0, the first node determines to transmit the second signaling.

In one embodiment, when the current value of the first counter reaches a first threshold, whatever the first priority is, the second signaling is determined to be transmitted.

In one embodiment, when the current value of the first counter reaches a first threshold, whatever the fourth priority is, the second signaling is determined to be transmitted.

In one embodiment, the first expired value is pre-configured.

In one embodiment, the first expired value is pre-specified.

In one embodiment, the first expired value is configured by an RRC signaling.

In one embodiment, the first expired value is no greater than the second expired value.

In one embodiment, the first expired value is configured by a base station.

In one embodiment, the first expired value is comprised in all or part of IEs in an RRC signaling.

In one embodiment, the first expired value is comprised in all or part of fields in an IE in an RRC signaling.

In one embodiment, the first expired value is comprised in a SIB.

In one embodiment, the first expired value is determined by UE implementation.

In one embodiment, the greater the value of the first counter is, the higher the second priority will be.

In one embodiment, $S=[s_1, s_2, s_3, s_T]$ is a queue consisting of T elements arranged in an ascending order, and $R=[r_1, r_2, r_3, r_T]$ is another queue consisting of T elements arranged in an ascending order, where $s_i$ is a natural number no greater than the first expired value, and $r_i$ is a natural number no greater than a maximum value of the first priority; each element in the queue S has a one-to-one correspondence relation to one element in the queue R, and T is a positive integer no greater than a maximum value of the first priority.

In one subembodiment, when a current value of the first counter is $s_i$, a value of the second priority is equal to a value of the first priority being subtracted by $r_i$; if the value of the first priority being subtracted by rj is less than 1, the value of the second priority is set to a value of 1.

In one subembodiment, when a current value of the first counter is between $[s_1, s_j]$, with the $s_i$ and the $s_j$ being 2 adjacent elements in the queue S, a value of the second priority is equal to a value of the first priority being subtracted by $r_i$; if the value of the first priority being subtracted by $r_i$ is less than 1, the value of the second priority is set to a value of 1.

In one subembodiment, when a current value of the first counter is between $[s_i, s_j]$, with the $s_i$ and the $s_j$ being 2 adjacent elements in the queue S, a value of the second priority is equal to a value of the first priority being subtracted by $r_i$; if the value of the first priority being subtracted by $r_i$ is less than 1, the value of the second priority is set to a value of 1.

In one embodiment, the queue T and the queue R are pre-configured.

In one embodiment, the queue T and the queue R are pre-specified.

In one embodiment, the queue T and the queue R are configured by a base station.

In one embodiment, the queue T and the queue R are comprised in all or part of IEs in an RRC signaling.

In one embodiment, the queue T and the queue R are comprised in all or part of fields in an IE in an RRC signaling.

In one embodiment, the queue T and the queue R are comprised in a SIB.

In one embodiment, the queue T and the queue R are determined by UE implementation.

In one embodiment, when the value of the first counter is greater than a first threshold, the second priority is one level higher than the first priority.

In one embodiment, when the value of the first counter is equal to a first threshold, the second priority is one level higher than the first priority.

In one embodiment, the phrase that the second priority is one level higher than the first priority includes that when the first priority is a highest priority, the second priority is still the highest priority.

In one embodiment, the phrase that the second priority is one level higher than the first priority includes that a value of the second priority is equal to a value of the first priority being subtracted by 1; when the value of the first priority being subtracted by 1 is less than a minimum value of the first priority, the value of the second priority is the minimum value of the first priority.

In one embodiment, the first threshold is equal to the second threshold.

In one embodiment, the first threshold is pre-configured.

In one embodiment, the first threshold is pre-specified.

In one embodiment, the first threshold is configured by a base station.

In one embodiment, the first threshold is comprised in all or part of IEs in an RRC signaling.

In one embodiment, the first threshold is comprised in all or part of fields in an IE in an RRC signaling.

In one embodiment, the first threshold is comprised in a SIB.

In one embodiment, the first threshold is determined by UE implementation.

In one embodiment, during running of the first counter, the second priority is higher than the first priority.

In one embodiment, during running of the first counter, the second priority is equal to the first priority.

In one embodiment, when a current value of the first counter is the initial value, the second priority is the same as the first priority.

In one embodiment, the phrase "during running of the first counter" includes that the first node and the second node are in direct communication.

In one embodiment, the phrase "during running of the first counter" includes that the first node and the second node are in unicast communication.

In one embodiment, the phrase "during running of the first counter" includes that the first node and the second node are in type2 groupcast communication.

In one embodiment, the phrase "during running of the first counter" includes that the first node and the second node are in unicast communication, and that the second node enables a HARQ feedback for the unicast communication.

In one embodiment, the phrase "during running of the first counter" includes that the first node is in a status of receiving a radio signal transmitted from the second node.

In one embodiment, the phrase "during running of the first counter" includes that the first node is in a status of receiving a radio signal transmitted from the second node and that the second node enables a HARQ feedback for the radio signal.

In one embodiment, when the second priority is equal to the third priority, it is the first node that determines to transmit either one of the second signaling and the third radio signal.

In one embodiment, when the second priority is equal to the third priority, the first node randomly selects either one of the second signaling and the third radio signal.

In one embodiment, when the second priority is higher than the third priority, the first node determines to transmit the second signaling.

In one embodiment, when the second priority is lower than the third priority, the first node determines to drop transmission of the second signaling.

In one embodiment, dropping transmission of the second signaling includes transmitting the third radio signal.

In one embodiment, dropping transmission of the second signaling includes receiving the third radio signal.

In one embodiment, dropping transmission of the second signaling includes transmitting a third radio signal set, the third radio signal set comprising the third radio signal; the second signaling does not belong to the third radio signal set.

In one embodiment, dropping transmission of the second signaling includes receiving a third radio signal set, the third radio signal set comprising the third radio signal.

In one embodiment, a time-domain resource occupied by the third radio signal has at least one overlapping multicarrier symbol with a time-domain resource occupied by the second signaling.

In one embodiment, a time-domain resource occupied by the third radio signal has at least one overlapping multicarrier symbol with a time-domain resource occupied by the second signaling; the at least one multicarrier symbol includes a GAP symbol before the second signaling, an Automatic Gain Control (AGC) symbol and a GAP symbol after the second signaling.

In one embodiment, the multicarrier symbol includes an Orthogonal Frequency-Division Multiplexing (OFDM) symbol.

In one embodiment, a frequency-domain resource occupied by the third radio signal and a frequency-domain resource occupied by the second signaling do not belong to a same Bandwidth Part (BWP).

In one embodiment, a frequency-domain resource occupied by the third radio signal and a frequency-domain resource occupied by the second signaling do not belong to a same Carrier.

In one embodiment, the third radio signal and the second signaling employ different access techniques.

In one embodiment, the third radio signal employs E-TRA radio access, while the second signaling employs NR radio access; or, vice versa.

In one embodiment, the procedure in which the first node determines whether to transmit the second signaling by comparing priority of the third radio signal and that of the second signaling can employ a method specified by clause 16.2.4 of 3GPP, TS 38.213.

In one embodiment, the third radio signal comprises a PSFCH.

In one embodiment, the third radio signal comprises a Physical Downlink Control Channel (PDCCH).

In one embodiment, the third radio signal comprises a Physical Downlink Shared Channel (PDSCH).

In one embodiment, the third radio signal comprises a Physical Uplink Shared Channel (PUSCH).

In one embodiment, the third radio signal comprises a Physical Uplink Control Channel (PUCCH).

In one embodiment, the third radio signal comprises a PSSCH.

In one embodiment, the third radio signal comprises a PSCCH.

In one embodiment, the third radio signal comprises a Primary Synchronization Signal/Secondary Synchronization Signal/Physical sidelink broadcast channel (PSS/SSS/PSBCH).

In one embodiment, the third radio signal comprises a Sidelink-Primary Synchronization Signal/Sidelink-Secondary Synchronization Signal/Physical sidelink broadcast channel (S-PSS/S-SSS/PSBCH).

In one embodiment, the third radio signal is a radio signal with a highest priority among a group of uplink radio signals waiting to be transmitted.

In one embodiment, the third radio signal is a radio signal with a highest priority among a group of sidelink radio signals waiting to be received.

In one embodiment, the action of transmitting the third radio signal set includes that the third radio signal set comprises K HARQ feedbacks, the first node transmits the K HARQ feedbacks, and the third radio signal is a HARQ feedback of a lowest priority among the K HARQ feedbacks; K is no greater than a product of M and a number of sub-channels comprised in a V2X resource pool where the first signaling exists; M is a PSFCH resource period in the V2X resource pool where the first signaling exists, M being one of 1, 2 or 4.

In one embodiment, the number of sub-channels comprised in the V2X resource pool is determined by frequency-domain resources of the V2X resource pool.

In one embodiment, the V2X resource pool comprises L Physical Resource Blocks (PRBs), and each sub-channel comprises N PRBs, so the number of sub-channels comprised by the V2X resource pool is given by $$\left\lfloor \frac{L}{N} \right\rfloor,$$

where the symbol $\lfloor \cdot \rfloor$ means rounding down an input value to a nearest integer.

Embodiment 6

Figure 6:
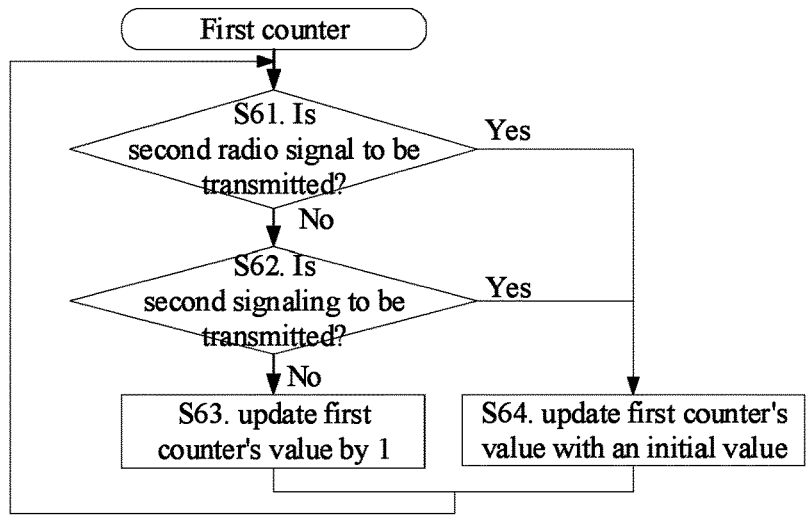
FIG. 6 illustrates a schematic diagram of procedures of a first counter according to one embodiment of the present disclosure.

Embodiment 6 illustrates a schematic diagram of procedures of a first counter according to one embodiment of the present disclosure, as shown in FIG. 6. Steps in the FIG. 6 are implemented by the first node:

Determining whether a second radio signal is transmitted in step S61; if so, implement step S64, if not, implement step S62; determining whether a second signaling is transmitted in step S62, if so, implement step S64, if not, implement step S63; updating a first counter's value by 1 in step S63 and then going back to step S61; or updating a first counter's value with an initial value in step S64 and then going back to step S61.

In one embodiment, the first counter is maintained in the first node.

In one embodiment, the first counter is maintained in a physical layer of the first node.

In one embodiment, the first counter is maintained in a higher layer of the first node.

In one embodiment, the value of the first counter is updated as the initial value when being initialized.

In one embodiment, the first counter being initialized includes the first node being power on.

In one embodiment, the first counter being initialized includes the first counter being configured.

In one embodiment, the first counter being initialized includes an RRC connection being established between the second node and the first node.

In one embodiment, the first counter being initialized includes a unicast communication being established between the second node and the first node.

In one embodiment, the first counter being initialized includes a HARQ enabled unicast communication being established between the second node and the first node.

In one embodiment, the first counter being initialized includes the first node having received PC5-RRC configuration information transmitted by the second node.

In one embodiment, the first node transmits the second radio signal, and as a response to the action of transmitting the second radio signal, updates the value of the first counter with the initial value.

In one embodiment, a target receiver of the second radio signal is the transmitter of the first signaling.

In one embodiment, the target receiver of the second radio signal is the second node.

In one embodiment, the second radio signal comprises a PSSCH.

In one embodiment, the second radio signal comprises a PSFCH.

In one embodiment, the second radio signal comprises a PSCCH.

In one embodiment, the second radio signal is transmitted via an air interface.

In one embodiment, the second radio signal is transmitted via a radio interface.

In one embodiment, the second radio signal is transmitted via a PC5 interface.

In one embodiment, the second radio signal is transmitted via a SL.

In one embodiment, time-frequency resources occupied by the second radio signal belong to a V2X resource pool.

In one embodiment, time-frequency resources occupied by the second radio signal are reserved for sidelink transmission.

In one embodiment, the first node transmits a second scheduling signaling and the second radio signal, the second scheduling signaling indicating configuration information of the second radio signal.

In one embodiment, the second scheduling signaling comprises SCI.

In one embodiment, the second scheduling signaling indicates at least one of a priority of the second radio signal, time-frequency resources occupied by the second radio signal or an MCS employed by the second radio signal.

In one embodiment, the second scheduling signaling respectively carries a link layer ID of the second node and some bits in a link layer ID of the first node.

In one embodiment, the second radio signal respectively carries a link layer ID of the second node and other remaining bits in a link layer ID of the first node.

In one embodiment, the second scheduling signaling comprises a Source Identifier and a Destination Identifier.

In one embodiment, the Source Identifier comprised by the second scheduling signaling comprises lower 8 bits in a link layer ID of the first node.

In one embodiment, the Destination Identifier comprised by the second scheduling signaling comprises lower 16 bits in the link layer ID of the second node.

In one embodiment, the second radio signal comprises a Source field and a Destination field.

In one embodiment, the Source field comprised by the second radio signal comprises higher 16 bits in the link layer ID of the first node.

In one embodiment, the Destination field comprised by the second radio signal comprises higher 8 bits in the link layer ID of the second node.

In one embodiment, the first node transmits the second signaling and, as a response to the action of transmitting the second signaling, updates the value of the first counter with the initial value.

In one embodiment, the first node drops transmitting the second signaling and, as a response to the action of dropping transmitting the second signaling, updates the value of the first counter by 1.

Embodiment 7

Figure 7:
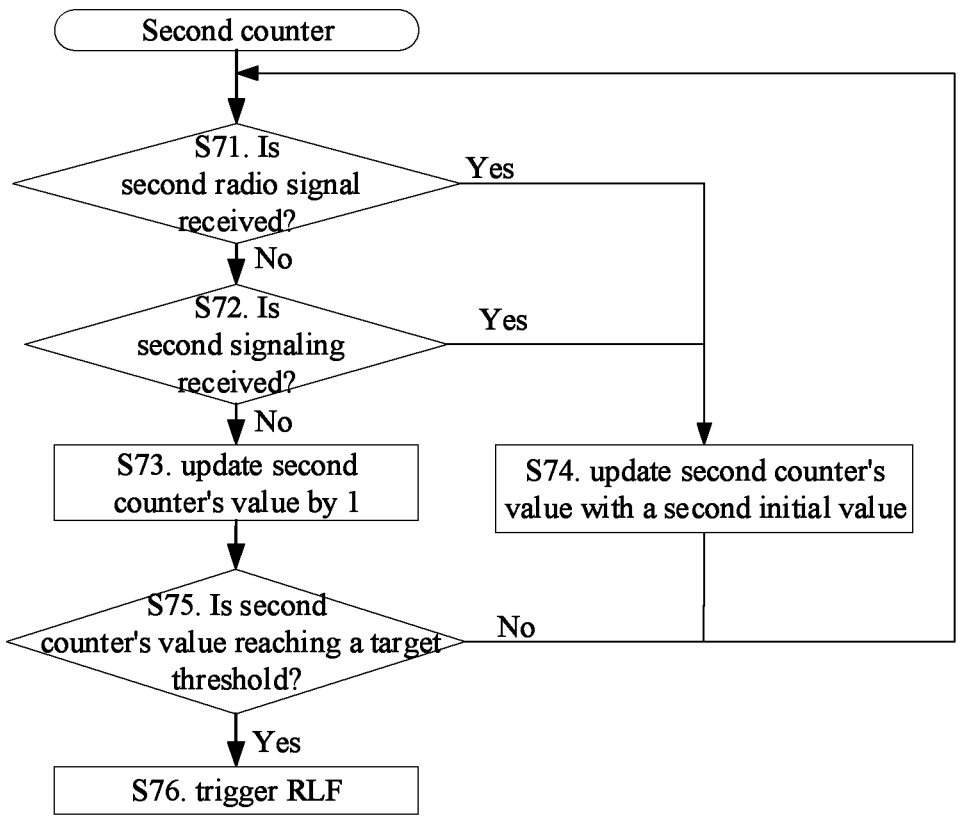
FIG. 7 illustrates a schematic diagram of procedures of a second counter according to one embodiment of the present disclosure.

Embodiment 7 illustrates a schematic diagram of procedures of a second counter according to one embodiment of the present disclosure, as shown in FIG. 7. Steps in the FIG. 7 are implemented by the second node:

Determining whether a second radio signal is received in step S71, if so, implement step S74, if not, implement step S72; determining whether a second signaling is received in step S72, if so, implement step S74, if not, implement step S73; updating a second counter's value by 1 in step S73; or updating the second counter's value with a second initial value in step S74 and then going back to step S71; and determining in step S75 whether the second counter's value reaches a target threshold, if so, triggering an RLF, if not, going back to step S71.

In one embodiment, the second counter is maintained in the second node.

In one embodiment, the second counter is maintained in a physical layer of the second node.

In one embodiment, the second counter is maintained in a higher layer of the second node.

In one embodiment, the value of the second counter is updated as the second initial value when being initialized.

In one embodiment, the second counter being initialized includes the second node being power on.

In one embodiment, the second counter being initialized includes an RRC connection being established between the second node and the first node.

In one embodiment, the second counter being initialized includes a unicast communication being established between the second node and the first node.

In one embodiment, the second counter being initialized includes a HARQ enabled unicast communication being established between the second node and the first node.

In one embodiment, the second counter being initialized includes the second node transmitting PC5-RRC configuration information to the first node.

In one embodiment, a blind detection is performed on a scheduling signaling and then decoding on the scheduling signaling to obtain a second bit block.

In one embodiment, the second bit block comprises an 8-bit Source Identifier and a 16-bit Destination Identifier.

In one embodiment, decoding on a PSSCH indicated by the scheduling signaling is performed to obtain a third bit block, the third bit block comprising a 16-bit Source field and an 8-bit Destination field.

In one embodiment, the phrase that the second node receives the second radio signal comprises that the 8-bit Source Identifier comprised by the second bit block is the same as the lower 8 bits in the link layer ID of the first node, and the 16-bit Destination Identifier comprised by the second bit block is the same as the lower 16 bits in the link layer ID of the second node.

In one embodiment, the phrase that the second node receives the second radio signal comprises that an 8-bit Source Identifier comprised by the second bit block, which is seen as lower 8 bits, and a 16-bit Source Field comprised by the third bit block, which is seen as higher 16 bits, compose a 24-bit source node link layer identifier, and the source node link layer identifier is the same as the 24 bits in the link layer identifier of the first node, besides, a 16-bit Destination Identifier comprised by the second bit block, which is seen as lower 16 bits, and an 8-bit Destination Field comprised by the third bit block, which is seen as higher 8 bits, compose a 24-bit destination node link layer identifier, and the destination node link layer identifier is the same as the 24 bits in the link layer identifier of the second node.

In one embodiment, the phrase that the second node does not receive the second radio signal comprises that the 8-bit Source Identifier comprised by the second bit block is different from the lower 8 bits in the link layer identifier of the first node.

In one embodiment, the phrase that the second node does not receive the second radio signal comprises that an 8-bit Source Identifier comprised by the second bit block, which is seen as lower 8 bits, and a 16-bit Source Field comprised by the third bit block, which is seen as higher 16 bits, compose a 24-bit source node link layer identifier, and the source node link layer identifier is different from the 24 bits in the link layer identifier of the first node.

In one embodiment, upon reception of the second radio signal, the second node updates the value of the second counter with the second initial value.

In one embodiment, updating the value of the second counter with the second initial value includes resetting the second counter.

In one embodiment, updating the value of the second counter with the second initial value includes updating the value of the second counter with 0.

In one embodiment, updating the value of the second counter with the second initial value includes updating the value of the second counter with the second expired value.

In one embodiment, the second node transmits the first signaling and the first radio signal, the first signaling indicating a feedback of the second signaling for a decoding result of the first radio signal.

In one embodiment, the second node transmits the first signaling and the first radio signal, determines a time-domain resource, a frequency-domain resource and a code-domain resource of the second signaling according to time-frequency resources occupied by the first signaling and the first radio signal, and receives the second signaling.

In one embodiment, the second node transmits the first signaling and the first radio signal, determines a time-domain resource, a frequency-domain resource and a code-domain resource of the second signaling according to time-frequency resources occupied by the first signaling and the first radio signal and a higher-layer Identifier of the first node, and receives the second signaling.

In one embodiment, the higher-layer Identifier of the first node is assigned by a higher layer.

In one embodiment, the higher-layer Identifier of the first node is assigned by a V2X layer of the second node.

In one embodiment, the higher-layer Identifier of the first node is assigned by an application layer of the second node.

In one embodiment, the second node receives the second signaling in a second slot.

In one embodiment, the second slot is a first PSFCH resource-comprising slot subsequent to a first time interval after a last slot for transmitting the first radio signal.

In one embodiment, the first time interval is configured by a base station.

In one embodiment, the first time interval is pre-configured.

In one embodiment, the first time interval is configured by an RRC signaling.

In one embodiment, the first time interval is configured by a SL-ConfigDedicatedNR in an RRC signaling.

In one embodiment, the first time interval is configured by a parameter MinTimeGapPSFCH in an RRC signaling.

In one embodiment, the first time interval is configured by a parameter sl-MinTimeGapPSFCH in an RRC signaling.

In one embodiment, the PSFCH resource-comprising slot is periodical in the V2X resource pool, and the PSFCH resource period can be one sidelink slot, or 2 or 4 sidelink slots, either configured by a base station or pre-configured.

In one embodiment, the second node receives the second signaling in a first PSFCH resource.

In one embodiment, for a PSSCH transmitted in a slot i and a subchannel j, $[(i+j \cdot N_{PSSCH}^{PSFCH}) \cdot M_{subch,slot}^{PSFCH}, (i+1+j \cdot N_{subch,slot}^{PSFCH}-1]$ PRBs are allocated first in an ascending order of slots and then an ascending order of frequency-domains, serving as frequency-domain resources for a corresponding PSFCH, where $0 \leq i \leq N_{PSSCH}^{PSFCH}$, and $0 \leq j \leq N_{subch}$, the $N_{PSSCH}^{PSFCH}$ refers to the period of PSFCH resources configured in a V2X resource pool, $M_{subch}^{PSFCH} = \lfloor N_{PRB,set}^{PSFCH}/N_{subsch} \cdot N_{PSSCH}^{PSFCH}) \rfloor$ set refers to the number of PRBs in the V2X resource pool used for transmitting the PSFCH, with the $M_{PRB,set}^{PSFCH}$ being either configured by a base station or pre-configured; the $N_{subch}$ is a number of subchannels comprised in the V2X resource pool, the $N_{subch}$ being configured by a base station or pre-configured; the symbol $\lfloor \cdot \rfloor$ means rounding down an input value to a nearest integer.

In one embodiment, a starting position of sub-channels occupied by the first radio signal is used to determine a first PSFCH resource set.

In one embodiment, a starting position of sub-channels occupied by the first radio signal and a number of sub-channels occupied by the first radio signal are used to determine a first PSFCH resource set.

In one embodiment, the first PSFCH resource set comprises PRBs of which the number is the $M_{subch,slot}^{PSFCH}$.

In one embodiment, the first PSFCH resource set comprises PRBs of which the number is a product of the number of sub-channels occupied by the first radio signal and the $M_{subch,slot}^{PSFCH}$.

In one embodiment, the first PSFCH resource set comprises PSFCH resources of which the number is $R_{PRB,}$ $_{CS}^{PSFCH} = N_{type}^{PSFCH} \cdot M_{subch,slot}^{PSFCH} \cdot N_{CS}^{PSFCH}$; herein, when a starting position of sub-channels occupied by the first radio signal is used to determine the first PSFCH resource set, $M_{type}^{PSFCH}$ is 1; when a starting position of sub-channels occupied by the first radio signal and a number of sub-channels occupied by the first radio signal are jointly used to determine the first PSFCH resource set $N_{type}^{PSFCH} = N_{subch}^{PSSCH}$, where $N_{subch}^{PSSCH}$ is the number of sub-channels occupied by the first radio signal; $N_{CS}^{PSFCH}$ indicates a cyclic shift pair, and $N_{CS}^{PSFCH}$ is configured by a higher layer of the base station or pre-configured; the PSFCH resources are arranged first according to an ascending order of PRBs and then of cyclic shift pairs.

In one embodiment, the Source Identifier comprised by the first signaling is used to determine an index of the first PSFCH resource in the first PSFCH resource set.

In one embodiment, the Source Identifier comprised by the first signaling and the higher-layer Identifier of the first node are used to determine an index of the first PSFCH resource in the first PSFCH resource set.

In one embodiment, an index of the first PSFCH resource in the first PSFCH resource set is $P_{ID}$ mod $R_{PRB,CS}^{PSFCH}$, where $P_{ID}$ is the Source Identifier comprised by the first signaling.

In one embodiment, when a cast type field comprised by the SCI Format 2-A in the first signaling is 01, an index of the first PSFCH resource in the first PSFCH resource set is $(P_{ID}+M_{ID})$mod $R_{PB,CS}^{PSFCH}$, where $P_{ID}$ is the Source Identifier comprised by the first signaling, and $M_{ID}$ is the higher-layer Identifier of the first node.

In one embodiment, the second node determines the PSFCH resource in a way specified in clause 16.3 of 3GPP, TS 38.213.

In one embodiment, the phrase of determining whether a second signaling is received includes that the second node receives either of an ACK or a NACK in the first PSFCH resource, indicating that the second signaling is received; or the second node receives neither the ACK feedback nor the NACK feedback in the first PSFCH resource, indicating that the second signaling is not received.

In one embodiment, upon reception of the second signaling, the second node updates the value of the second counter with the second initial value; when not receiving the second signaling, the second node updates the value of the second counter by 1.

In one embodiment, the phrase of updating the value of the second counter by 1 includes adding the value of the second counter by 1.

In one embodiment, the phrase of updating the value of the second counter by 1 includes subtracting the value of the second counter by 1.

In one embodiment, when the current value of the second counter reaches the target threshold, as a response, the second node triggers an RLF.

In one embodiment, when the second initial value of the second counter is 0, the action of updating the second counter by 1 includes adding the value of the second counter by 1, the target threshold being the second expired value, when the value of the second counter reaches the second expired value, the second node triggers the RLF.

In one embodiment, when the second initial value of the second counter is the second expired value, the action of updating the first counter by 1 includes subtracting the value of the second counter by 1, the target threshold being 0, when the value of the second counter reaches 0, the second node triggers the RLF.

Embodiment 8

Figure 8:
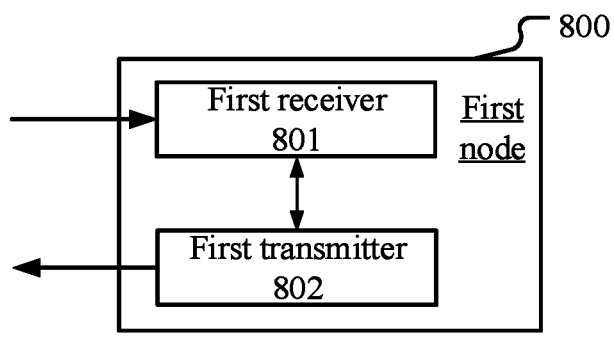
FIG. 8 illustrates a structure block diagram of a processing device in a first node according to one embodiment of the present disclosure.

Embodiment 8 illustrates a structure block diagram of a processing device in a first node according to one embodiment of the present disclosure, as shown in FIG. 8. In FIG. 8, a processing device 800 in a first node comprises a first receiver 801 and a first transmitter 802. The first receiver 801 comprises at least one of the transmitter/receiver 454 (comprising the antenna 452), the receiving processor 456, the multi-antenna receiving processor 458 or the controller/processor 459 in FIG. 4 of the present disclosure; the first transmitter 802 comprises at least one of the transmitter/receiver 454 (comprising the antenna 452), the transmitting processor 468, the multi-antenna transmitting processor 457 or the controller/processor 459 in FIG. 4 of the present disclosure.

In Embodiment 8, the first receiver 801 receives a first signaling and a first radio signal, the first signaling indicating a first priority; the first transmitter 802 determines whether to transmit a second signaling jointly according to a current value of a first counter and the first priority; when determining to transmit the second signaling, the first transmitter transmits the second signaling and updates a value of the first counter with an initial value; when determining not to transmit the second signaling, the first transmitter drops transmission of the second signaling and updates the value of the first counter by 1; herein, the first signaling comprises configuration information of the first radio signal, and the second signaling is used for indicating whether the first radio signal is correctly decoded.

In one embodiment, steps taken by the first receiver and the first transmitter are implemented in an iterative process, including receiving the first signaling and the first radio signal, the first signaling indicating the first priority; determining whether to transmit the second signaling jointly according to the current value of the first counter and the first priority; when determining to transmit the second signaling, transmitting the second signaling and updating the value of the first counter with the initial value; when determining not to transmit the second signaling, dropping transmission of the second signaling and updating the value of the first counter by 1; the value of the first counter, after being updated, is seen as the current value of the first counter in a next iteration.

In one embodiment, the first transmitter 802 determines a second priority jointly according to the current value of the first counter and the first priority; herein, when the first counter is running, the second priority is no lower than the first priority.

In one embodiment, when the current value of the first counter reaches a first threshold, the second signaling is determined to be transmitted.

In one embodiment, the first transmitter 802 transmits a second radio signal; and updates the value of the first counter with the initial value as a response to the action of transmitting the second radio signal; herein, a target receiver of the second radio signal is just the same as the transmitter of the first signaling.

In one embodiment, the first transmitter 802 determines a second priority jointly according to the current value of the first counter and the first priority; herein, when the first counter is running, the second priority is no lower than the first priority; comparing the second priority and a third priority, when the second priority is higher than the third priority, the second signaling is transmitted; when the second priority is lower than the third priority, the transmission of the second signaling is dropped; herein, the third priority indicates a priority of a third radio signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first-type communication node, UE or terminal in the present disclosure includes but is not limited to mobile phones, tablet computers, notebooks, network cards, low-consumption equipment, enhanced MTC (eMTC) equipment, NB-IoT equipment, vehicle-mounted communication equipment, aircrafts, aeroplanes, unmanned aerial vehicles, telecontrolled aircrafts, etc. The second-type communication node or base station, or network equipment in the present disclosure includes but is not limited to macro-cellular base stations, micro-cellular base stations, home base stations, relay base station, eNB, gNB, Transmission and Reception Point (TRP), relay satellite, satellite base station or airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives a first signaling and a first radio signal, the first signaling indicating a first priority;
a first transmitter, which determines whether to transmit a second signaling according to a current value of a first counter and the first priority; when determining to transmit the second signaling, the first transmitter transmits the second signaling, and updates a value of the first counter with an initial value as a response of transmitting the second signaling; when determining not to transmit the second signaling, the first transmitter drops transmission of the second signaling, and updates the value of the first counter by 1 as a response of dropping transmission of the second signaling;
wherein determining whether to transmit a second signaling according to a current value of a first counter and the first priority includes:
when the current value of the first counter reaches a first threshold, whatever the first priority is, the second signaling is determined to be transmitted; or
when the current value of the first counter is equal to or less than a second threshold, whether to transmit the second signaling is determined according to the first priority;
the second threshold is less than the first threshold; the first signaling comprises configuration information of the first radio signal, and the second signaling is used for indicating whether the first radio signal is correctly decoded; the first signaling is a control signal; the first radio signal is a data signal; the first counter is maintained by the first node, and the first node is a User Equipment.

2. The first node according to claim 1, wherein steps taken by the first receiver and the first transmitter are implemented in an iterative process, including receiving the first signaling and the first radio signal, the first signaling indicating the first priority; determining whether to transmit the second signaling according to the current value of the first counter and the first priority; when determining to transmit the second signaling, transmitting the second signaling and updating the value of the first counter with the initial value; when determining not to transmit the second signaling, dropping transmission of the second signaling and updating the value of the first counter by 1; the value of the first counter, after being updated, is seen as the current value of the first counter in a next iteration.

3. The first node according to claim 1, comprising:
the first transmitter, which determines a second priority according to the current value of the first counter and the first priority;

wherein when the first counter is running, the second priority is no lower than the first priority.

4. The first node according to claim 3, comprising the following when the first counter is running: the first node is in a state of receiving a radio signal transmitted by a transmitter of the first signaling and in which a HARQ feedback for the radio signal is enabled.

5. The first node according to claim 1, comprising:
the first transmitter, which transmits a second radio signal to a second node; and which updates the value of the first counter with the initial value upon transmission of the second radio signal.

6. The first node according to claim 1, wherein the greater the value of the first counter is, the higher the second priority will be.

7. The first node according to claim 1, wherein comparing the second priority and a third priority, when the second priority is higher than the third priority, the second signaling is transmitted; when the second priority is lower than the third priority, the transmission of the second signaling is dropped;
wherein the third priority indicates a priority of a third radio signal.

8. The first node according to claim 7, wherein the action of dropping transmission of the second signaling includes: transmitting the third radio signal; or receiving the third radio signal;
wherein a time-domain resource occupied by the third radio signal has at least one overlapping multicarrier symbol with a time-domain resource occupied by the second signaling.

9. A method in a first node for wireless communications, comprising:
receiving a first signaling and a first radio signal, the first signaling indicating a first priority;
determining whether to transmit a second signaling according to a current value of a first counter and the first priority; when determining to transmit the second signaling, transmitting the second signaling, and updates a value of the first counter with an initial value as a response of transmitting the second signaling; when determining not to transmit the second signaling, dropping transmission of the second signaling, and updates the value of the first counter by 1 as a response of dropping transmission of the second signaling;
wherein determining whether to transmit a second signaling according to a current value of a first counter and the first priority includes:
when the current value of the first counter reaches a first threshold, whatever the first priority is, the second signaling is determined to be transmitted; or
when the current value of the first counter is equal to or less than a second threshold, whether to transmit the second signaling is determined according to the first priority;
the second threshold is less than the first threshold; the first signaling comprises configuration information of the first radio signal, and the second signaling is used for indicating whether the first radio signal is correctly decoded; the first signaling is a control signal; the first radio signal is a data signal; the first counter is maintained by the first node, and the first node is a User Equipment.

10. The method in the first node according to claim 9, wherein steps are taken to receive the first signaling and the first radio signal, the first signaling indicating the first priority; whether to transmit the second signaling is determined according to the current value of the first counter and the first priority; when determining to transmit the second signaling, the second signaling is transmitted and the value of the first counter is updated with the initial value; when determining not to transmit the second signaling, transmission of the second signaling is dropped and the value of the first counter is updated by 1; the value of the first counter, after being updated, is seen as the current value of the first counter in a next iteration.

11. The method in the first node according to claim 9, comprising:
    determining a second priority according to the current value of the first counter and the first priority;
    wherein when the first counter is running, the second priority is no lower than the first priority.

12. The method in the first node according to claim 11, comprising the following when the first counter is running: the first node is in a state of receiving a radio signal transmitted by a transmitter of the first signaling and in which a HARQ feedback for the radio signal is enabled.

13. The method in the first node according to claim 11, wherein the greater the value of the first counter is, the higher the second priority will be.

14. The method in the first node according to claim 11, wherein comparing the second priority and a third priority, when the second priority is higher than the third priority, the second signaling is transmitted; when the second priority is lower than the third priority, the transmission of the second signaling is dropped;
    wherein the third priority indicates a priority of a third radio signal.

15. The method in the first node according to claim 14, wherein the action of dropping transmission of the second signaling includes: transmitting the third radio signal; or receiving the third radio signal;
    wherein a time-domain resource occupied by the third radio signal has at least one overlapping multicarrier symbol with a time-domain resource occupied by the second signaling.

16. The method in the first node according to claim 9, comprising:
    transmitting a second radio signal to a second node; and
    updating the value of the first counter with the initial value upon transmission of the second radio signal.

* * * * *